(12) United States Patent
Kemmler et al.

(10) Patent No.: US 8,539,479 B2
(45) Date of Patent: Sep. 17, 2013

(54) SYSTEM AND METHOD FOR APPLICATION FUNCTION CONSOLIDATION

(75) Inventors: Andreas Kemmler, Bönnigheim (DE); Torsten Kamenz, Wiesloch (DE)

(73) Assignee: SAP AG, Walldorf (DE)

( * ) Notice: Subject to any disclaimer, the term of this patent is extended or adjusted under 35 U.S.C. 154(b) by 790 days.

(21) Appl. No.: 12/771,254

(22) Filed: Apr. 30, 2010

(65) Prior Publication Data

US 2011/0271286 A1    Nov. 3, 2011

(51) Int. Cl.
*G06F 9/445* (2006.01)
*G06F 9/44* (2006.01)

(52) U.S. Cl.
USPC ............ 717/175; 717/120; 717/177; 717/121

(58) Field of Classification Search
USPC ........................... 717/163, 168, 170, 174, 175
See application file for complete search history.

(56) References Cited

U.S. PATENT DOCUMENTS

| | | | |
|---|---|---|---|
| 6,725,452 B1 * | 4/2004 | Te'eni et al. | 717/168 |
| 8,037,471 B2 * | 10/2011 | Keller et al. | 717/174 |
| 8,352,935 B2 * | 1/2013 | Isaacson et al. | 717/173 |
| 8,365,164 B1 * | 1/2013 | Morgenstern | 717/175 |
| 8,413,134 B2 * | 4/2013 | Celli et al. | 717/174 |
| 2002/0129346 A1 * | 9/2002 | Lee et al. | 717/163 |
| 2002/0188941 A1 * | 12/2002 | Cicciarelli et al. | 717/175 |
| 2006/0026586 A1 * | 2/2006 | Remmel et al. | 717/170 |
| 2008/0201705 A1 * | 8/2008 | Wookey | 717/175 |
| 2009/0144716 A1 * | 6/2009 | Felts | 717/168 |

OTHER PUBLICATIONS

Narasimhan et al., A New Suite of Metrics for the Integration of Software Components, 2004, Researchgate.net.*
Kloggen, Reconstruction of Software Component Architectures and Behaviour Models using Static and Dynamic Analysis, 2010, Karlsruher Instituts für Technologie.*

* cited by examiner

*Primary Examiner* — Lewis A Bullock, Jr.
*Assistant Examiner* — Gilles Kepnang
(74) *Attorney, Agent, or Firm* — Kenyon & Kenyon LLP (57) ABSTRACT

Systems and methods that facilitate keeping or improving the current/prior level of complexity in a software package, despite enhancement package additions. To keep the current number of business functions (e.g., some software configuration or functionality), new packages may have to consolidate older ones. Consolidating business functions may include dissolving those functions into the core set of functions (e.g., those functions that are "always on") or to merge them with other business functions (e.g., to be switched on or off as a set). Additionally, if a function is simply not used, and will never be used again, the function may be dissolved completely. Regardless, disruption to the customer should be minimized by any consolidation of functions. Systems and methods identify functions that can be automatically consolidated, and facilitate the consolidation of any remaining functions.

13 Claims, 5 Drawing Sheets

SYSTEM AND METHOD FOR APPLICATION FUNCTION CONSOLIDATION

BACKGROUND

Software applications and application suites have become increasingly complex, constituting millions of individual functions available to users (e.g., a large company with hundreds of different job tasks). Further, software applications must be adaptable to customer demands. While software used to be released in versions, modern software is typically updated several times before a new "version" is established. A software enhancement package strategy may simplify the way customers manage and deploy new software functionality. Customers may selectively implement these software functions (e.g., as included in the enhancement package) and activate the software upon business demand. As a result, customers can isolate the impact of software updates from introducing/rolling out new functionality and bring new functionality online faster through shortened testing cycles.

The enhancement package model may deliver innovations through the enhancement packages approximately every year. Customers would no longer have to plan for major releases every five years. They could now choose to selectively implement the business functions or technical improvements that add the value that matters most to their business. Software developers may use enhancement packages to quickly and easily deliver business and industry-specific functionality, enterprise services, and other functions that help improve and simplify the use of existing software packages, through user interface and other end-to-end process improvements. This rapid, nonintrusive deployment of selected improvements may allow all customers to use the offered innovations according to the added value they bring to them and according to their own timetable.

Enhancement packages may be cumulative from a functional perspective, e.g., current enhancement packages may contain the entire content of earlier packages. So each enhancement package may be based on the previous one. Given the cumulative nature of the enhancement packages, function growth may be exponential, e.g., each added function may create newly added functions in future packages, while each may create new functions in even further future packages, and so on. Each function may not necessarily add future functions, but each function may potentially add new functions. For example, function changes may be required when legal requirements change, industry practice changes, business models change, market forces change, etc. Applicants have thus identified a need for various tools designed to facilitate the consolidation of these functions to minimize maintenance demands of the overall system. Example embodiments of the present invention may relate to an engine for facilitating the consolidation of individual functions.

As noted above, a software enhancement package may include a set of enhanced functionality that may be integrated into an existing software suite. Each enhancement package may contain new versions of existing software components and/or completely new functions. Within the enhancement packages customers may choose which software components should be updated in their systems depending on the new/extended functionality they want to use.

In enhancement package contexts, it may be the case that new functionality must be explicitly switched on to become active/visible in the system. A core unit of functionality within the system, and as described herein, may be referred to as a business function. The business function may also be the core unit within an enhancement package that can be activated/switched on. Activating a business function may trigger switches, which may then influence the execution of the code enhancements. These switches may ensure that customers only see and make use of the new functionality if they have activated them. The activation process may also start a job (e.g., a batch-job or cron-job, etc.) in the example system that automatically performs all changes in that example system.

Offering customers the choice of which software components are to be installed to a system and the choice to decide which and when a business function gets activated may increase the internal complexity of the software. Development teams may need to implement each change to most of the development objects in a switchable way. That is, it may not be possible to just change an object, but the developers may have to think about the consequence of any change. Developers may have to implement changes in a way that causes no effects in a customer's system so long as the switches of business functions are not activated. In addition, the number of the business functions may increase with every enhancement package, which may generate, e.g., after several enhancement packages, a huge number of business functions. This huge number of business functions may increase the risk of interferences between business functions, which may increase the complexity to be handled by the development teams. In this context, to maintain a high level of software quality, a decrease of development efficiency may be unavoidable. Sometime in the future, e.g., after enough enhancement packages, a level of complexity may be reached which decreases the development efficiency to an extent that cost-effective developments are no longer possible and/or countermeasures become indispensable.

DETAILED DESCRIPTION

Embodiments of the present invention pertain to systems and methods for containing the overall complexity of software functions in the context of ever growing functionality via enhancement packages, as illustrated with the example embodiments described herein.

Example embodiments of the present invention include systems and methods that may facilitate keeping or improving the current/prior level of complexity of a software application or application suite despite enhancement package additions. To keep the current number of business functions, new packages may have to consolidate older ones. Consolidating business functions may include dissolving those functions into the core set of functions (e.g., those functions that are "always on") or merging them with other business functions (e.g., to be switched on or off as a set). Additionally, if a function is simply not used, and will never be used again, the function may be dissolved completely. Regardless, disruption to the customer should be minimized by any consolidation of functions.

Figure 1A:
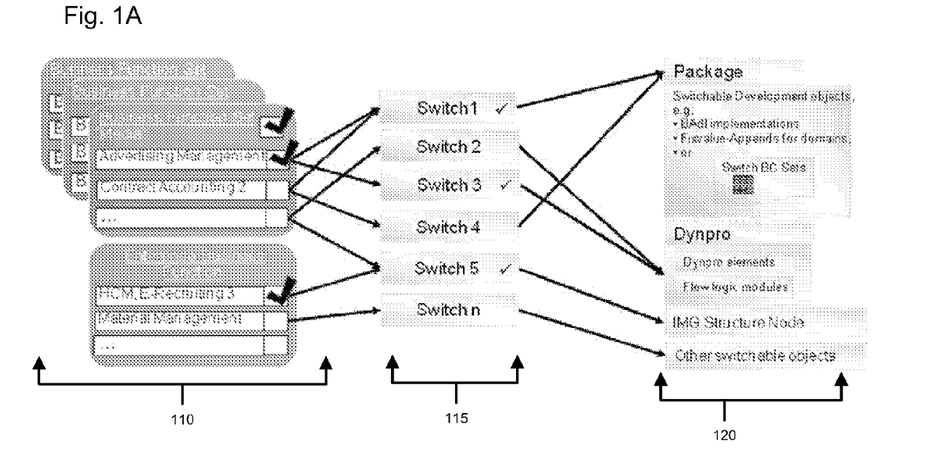
FIG. 1A illustrates an example switch framework and enhancement pack arrangement, according to one example embodiment of the present invention.

In enhancement packages new functionality may need to be explicitly switched on to become active/visible in the system. FIG. 1A illustrates the basic architecture of an example switch framework, which may be used in a software suite. On the left, e.g. at 110, there are example business functions, organized in business function sets. Business functions may represent a set of new or changed functionality that is offered as a marketable unit within the enhancement packages. Business functions may be activated (e.g., switched on) by customers, so that the new functionality becomes visible and can be used in customer systems. In this example embodiment, the activation of a business function may activate (e.g., switch on) the so called switches (e.g., 115). The development objects (e.g., 120) may be assigned to switches and as soon as a switch gets switched on the development objects may become visible and active. For code enhancements this may mean, for example, that they are executed only when the assigned switch is active/switched on.

Figure 1B:
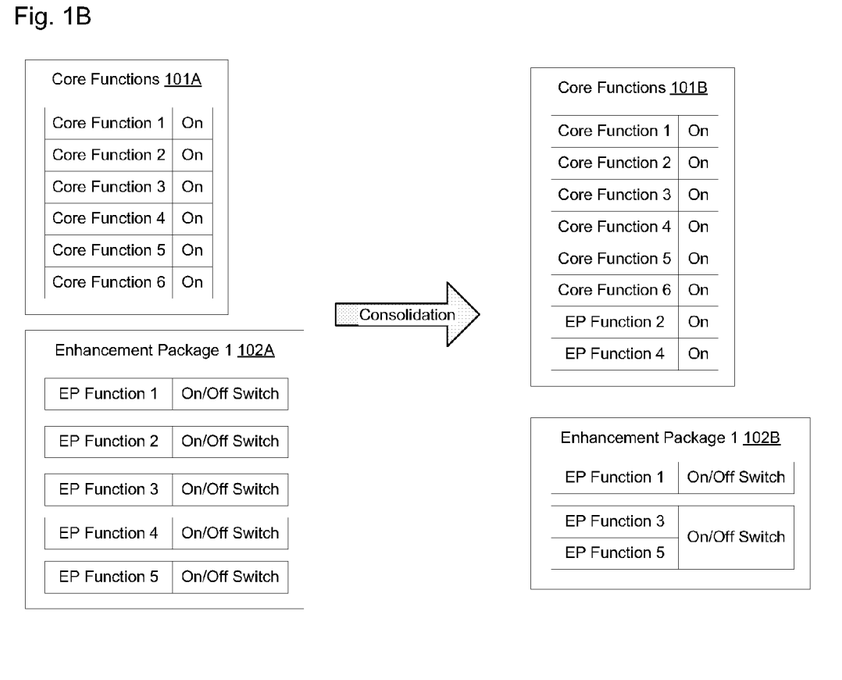
FIG. 1B illustrates example data structures, according to one example embodiment of the present invention.

FIG. 1B illustrates a graphical representation of the functional changes a consolidation may cause. For example, a software suite may contain a core set of functions (e.g., 101A). These functions are illustrated with an "on" designation. Core functions may always be on, regardless of whether the function includes an "always on switch" or any other designation, aside from inclusion in the core set of functions. This function set (e.g., core functions 101A) may have been issued to customers as a new software package. Subsequently, (e.g., based on user feedback or other needs to add or mend functionality) an enhancement package may be created and integrated into the software suite, e.g., enhancement package 1 102A. This package may create new functions for the software suite, e.g., EP functions 1 to 5. Each enhancement package function may include a switch attribute, so that each customer may decide which functions to turn on, and which functions to leave off. Each function that is activated, may have the potential to cause some disruption in the operations of the user, so only functions that are needed might be activated, and then, may be activated in subsets, for testing and debugging the enhancement process.

At a later time, perhaps because additional enhancement packages have been delivered (not shown) or will be delivered, a consolidation may be performed. Some functions, e.g., EP functions 2 and 4, may be dissolved into the core functions, e.g., as shown in 101B. Some functions, e.g. EP functions 3 and 5, may be merged together, and may now share a switch. These functions, unlike core functions which are always on, may still be switched off, but only as a group. Thus, customers who require either function, may now have to accept both functions. Some functions, e.g. EP function 1, may be left unaltered.

Generally, several factors may determine the best methods of consolidation, which may be analyzed in several steps. For example, for each business function, it may be determined how many customers currently use that function. If the function is consolidated into the set of mandatory core functions (e.g., always-on functions), this percent may represent the percentage of customers who will not experience problems from the consolidation, whereas the remaining customers potentially could experience problems (e.g., as the business function is activated, by virtue of it becoming mandatory). To cause the least disruption as possible, it may be important to know which business function are used by customers and the combination of business functions that are usually used together. This data may be automatically collected by usage-data reporting mechanisms. These reporting mechanisms may be added, or may also already be fully implemented, as function usage-date is valuable for other uses.

Business function consolidation may include reducing complexity by reducing the number of business functions, including reducing the number of possible combinations of activated business functions. However, reducing the number of business functions may also include a degree of disruption to customers. Since, functionality that could be switched off before the consolidation may then be offered as standard functionality, or at least switched concurrently with other functionality. For customers, this may mean that certain functionality gets automatically activated through the consolidation. Consolidation may include a number of operations. For example, functions may be dissolved as separate entities and the corresponding functionality may be offered directly. Dissolving may mean that the function (e.g., now part of the core functions) is no longer assigned to a switch. For customers already using the business function there may be no change. However, for customers not using the functionality it may be automatically activated once dissolved into the core function, which could cause a certain degree of disruption. Consolidation may also include merging. In this case, switching may still be needed but with another level of granularity, e.g., the merged functions share a switch, being turned on and off concurrently. Customers that have all of the merged business functions either on or off already, may not see any changes. However, customers having only a part of the merged business functions in use, may have the others activated automatically through the merging process. This may cause a certain degree of disruption also.

Thus, one measure of the degree of disruption caused by business function consolidation may depend on how many customers are using the business functions to be consolidated. Business functions used by all customers may be easily consolidated without causing disruption. However, business functions used by nearly no customers may have a large potential for disruption. In addition, the degree of disruption may depend on the type of functionality which is switched on and/or the way the switched functionality is implemented. For example, functionality that is central in important business processes may have a large potential of disruption, whereas functionality that influences only optional secondary processes may have less potential for disruption. In both cases it may depend on the changes themselves, e.g., some new fields on existing screens may be less disruptive than the introduction to a new mandatory process step. Changes that work immediately after their activation may be more disruptive than changes which need an additional configuration before they become fully effective. Also, changes that replace existing functionality may also be more disruptive than the ones that are offering additional optional features. Aside from customer impact, other factors may be relevant to a consolidation, such as, the amount of effort required to perform the consolidation.

Figure 2:
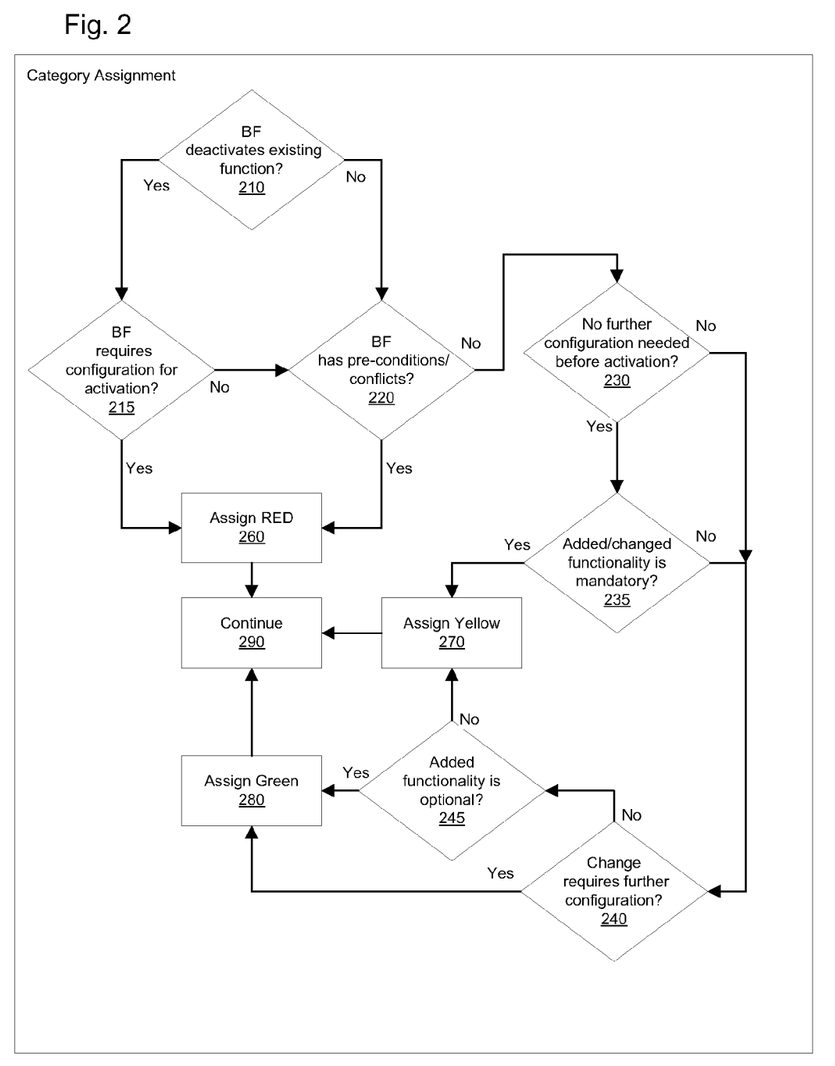
FIG. 2 illustrates an example categorization process, according to one example embodiment of the present invention.

Several functions may be defined as part of example embodiments. For example, a GET_CATEGORY_OF_BF function may take in a business function pointer and return a category (e.g., as illustrated in FIG. 2). A search function GET_BUSINESS_FUNCTIONS_OF_CATEGORY may take in a category input, and return (e.g., an array of pointers to) all the business functions of that category. A function may also be provided to get a list of dependent business functions (e.g., GET_DEPENDENT_BF), which may take in a business function (e.g., a pointer or database key, etc.) and return a list (e.g., array of pointers) of functions dependent on the input business function. In one example embodiment, dependency on a more critical category (e.g., "red") may not necessarily indicate that the dependent function should be categorized within the same group. Knowing which business function(s) depend on a particular business function may be a good indicator of how easy it will be to consolidate that particular business function. All dependent BFs (Business Functions) may need to be taken into account, as the more dependent BFs there are, the more BFs may need to be considered and enclosed into any consolidation.

Additionally, knowing the premised business function(s) (e.g., the ancestor business function(s) and/or those functions from which the current function depends on) may be even more important than knowing the dependent business function(s). All premised business function(s) may need to be enclosed in a consolidation, and a function GET_PREMISED_BF may be provided. These latter functions may need to be executed not only for the business function being analyzed, but for each business function it depends from and/or is the premise of (e.g., each dependent of the business function), and so on, until each path of dependency is analyzed to a terminal node (e.g., each root and/or leaf connected to the analyzed business function).

Example embodiments of the present invention include systems and methods for facilitating the above mentioned consolidation of business functions. In one example embodiment, each function may be categorized based on some metric of how great a customer impact that function may have, assuming the function is not currently being used. Categories could be labeled any number of ways, and decided based on any number of conditions. The particular implementation may dictate some or all of these variations, but may be apparent, based on the underlying system. FIG. 2 illustrates one such implementation using category labels of Green, Yellow, and Red for escalating consolidation complexity. Example implementations of the categorization may require adjustments to the various function database(s). For example, each function may require a new category field or attribute, and/or each function may require a category note field or attribute for optional notations. This field may be used to list technical details that led to the category designation. It may also record other notes relevant to the consolidation, e.g., what configurations are necessary before the function becomes active in the consolidation.

The example categorization procedure of FIG. 2 may operate for each business function of one or more enhancement packages. The example procedure may start at 210 and determine if this business function will deactivate an existing business function. This may be a replacement business function (e.g., a new version) or any number of other functions, that automatically deactivate some other business function. If so, next at 215, the example procedure may determine if that business function requires pre-activation configurations. Some business functions may require manual configuration within the system, and thus, may only be activated once this pre-condition occurs. If so, then at 260, the business function category may be assigned "RED" (or any number of other designations to indicate a first level of criticality). This path leads to the red category, because it indicates the business function (1) overwrites an existing function and (2) does not itself become immediately active. Thus, in this situation functionality is deactivated and not replaced (e.g., until configuration occurs). If the business function either does not deactivate existing functions (e.g., at 210) or does not require pre-configuration (e.g., at 215), then the business function may be analyzed for pre-conditions or conflicts, e.g. at 220. These may be specific pre-conditions, specified by the software development team(s), or may be all pre-conditions and conflicts. It may also include business functions that require configuration after activation, or any other situation in which a critical conflict would arise. If this is the situation, again, the red category may be assigned. Else, analysis may progress to 230.

At 230 and 235, if all of these conditions are met, it may lead to a "YELLOW" (e.g., medium or a second level of criticality) designation. For example, at 235, if a business function adds or changes mandatory functionality, and does not require configuration before activation (e.g., the function goes live on installation (230)), then the function may receive a yellow designation. Otherwise, analysis may progress to 240, where the example procedure may determine if either 240, or 245 are met. For example, if the business function indicates that any added or changed functionality is conditioned on further configuration (e.g., does not take effect until manual actions occur), then at 240, this business function may be assigned a "GREEN" designation (e.g., a low probability for conflicts or disruptions). Also, if the business function adds or changes only optional functions (e.g., an optional data field), this too may lead to a category assignment of green, e.g., at 245. After a category is assigned (e.g., at 260, 270, or 280), the example process may continue at 290, which may include reiterating through any further enhancement business functions. If no conditions are met (e.g., at 245 "No"), the example process may assign a default category, or otherwise designate these business functions as not meeting any conditions for a disruption category. The example embodiment of FIG. 2 illustrates a negative determination at 245 as progressing to the assignment of yellow 270, e.g., a medium criticality. In this instance, yellow may have been configured as the default category. A user may configure any number of other defaults, including a null category.

Several additional functions may be provided to facilitate the analyzing and consolidation procedures. A function to ascertain conflicts may be provided that takes in a business function and returns a list of conflicting business functions. Conflicts with other business functions may mean that only one of them can be activated. Conflicts may arise in a number of situations, for example, a function may perform a basic task for a first industry and the same task for a second industry, but require the task industry specific attributes. For example, a grain commodity market may measure units of underlying commodities by volume, e.g., cubic meters. However, the oil industry and a commodity trading market for oil may measure units by volume and temperature, as the density per cubic meter, and thus real quantity, may vary with temperature. Though the functions provided for these commodity systems may generally be the same, they pose a conflict with regard to mandatory attributes. Another example may include the inclusion of a mandatory data entry step that is not present in other forms of that process function. A subsequent function may simplify the process and render the additional user input step useless. Since both functions should not be activated simultaneously (e.g., a function that renders a step useless and a function that requires that step), they two functions are in conflict. When a business functions gets dissolved this may mean that all conflicting business functions are no longer eligible for dissolution. Therefore it may be important to know if a business function has conflicts with other business functions.

It may be possible that a single switch is already assigned to more than one business function. Such business functions are sharing the switch. When one of the functions has to be consolidated, all the others may have to be taken into account. The whole cluster may need to be analyzed to determine whether it is possible to dissolve only a part of the set of functions sharing a switch. A function may be implemented to take in a business function and return a list of business functions assigned to the same switch as the input business function. It may also be the case that a business function has been provided a switch in a different layer of software, or in a different update package. Consolidating this business function may therefore affect other software components. A function may be implemented to take in a business function to search for and return a list of assigned switches in other components.

A function MERGE_BUSINESS_FUNCTION may be provided to support merging of business functions. The switches assigned to the business function to be merged may be reassigned to the resulting business function. For example, function A and function B may be candidates for a merge (e.g., they have a high correlation, high usage, and no conflicts). With reference to the switch framework described in FIG. 1A, each of these functions may have one or more switches associated with them (e.g., function A may have switch a1 and a2, while function B may have b1). The merge business function may consolidate these into a function AB and assign the new function AB all of switches a1, a2, and b1. This way, the functions are switched together, in that user activation of merged function AB will switch on a1, a2, and b1 (e.g., the development objects associated with those). This function may execute several checks about the feasibility of a merge, for example it may consider the software components to which the business functions to be merged are assigned and any conflicts therein.

Figure 3:
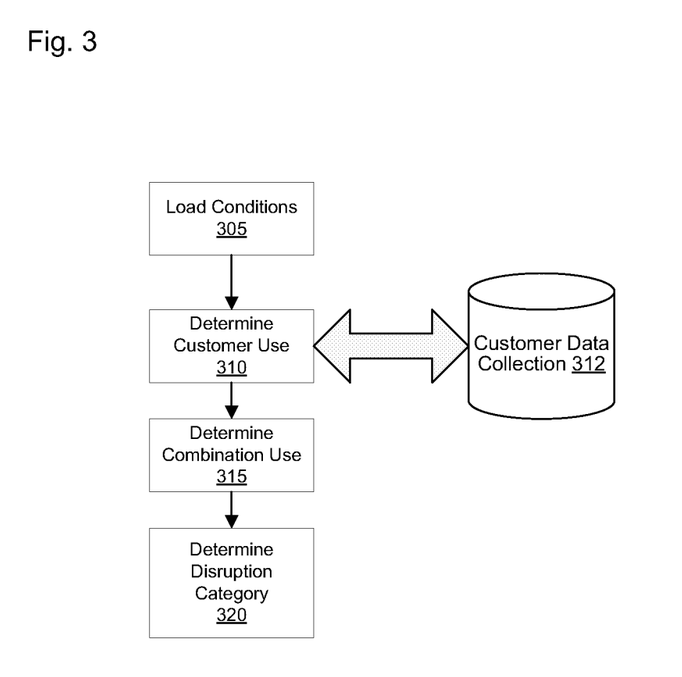
FIG. 3 illustrates an example initializing process, according to one example embodiment of the present invention.

One example embodiment of the present invention may include a consolidation engine. The consolidation engine may include one or more servers or other electronic computer systems. The consolidation engine may include one or more software modules, including one or more of the functions described herein. The server may include memory, such as RAM and a large data storage area for storing the software functions, among other datasets. The servers may be networked locally, and/or distributed geographically, while providing virtual user terminals and/or connections to independent user terminals. Based on the functions described herein, all the information may be available to plan a business function consolidation. Missing are only the configurable conditions that are relevant to a specific consolidation project and application of the example embodiment. The consolidation engine may receive a conditions dataset, including, for example, the area in which the consolidation should take place, the amount of business functions that should be consolidated, or the maximum disruption. Because these conditions vary from project to project, an engine is needed which calculates a consolidation proposal based on the given conditions. FIG. 3 illustrates one such example embodiment. First, the example procedure may load user customizable conditions about the specific software suite, package, and/or project that will be analyzed for consolidation, e.g., at 305. Next, at 310, the example procedure may load various pieces of customer usage data, which may be stored in a data sharing repository 312. This data may be collected specifically for the consolidation engine, or may be shared among other processes requiring usage data. Next, at 315, the example process may compile data on combination use, e.g., the probability a second business function will be in use, given that a first business function is in use. Business functions with a high correlation (e.g., a high probability that use of one indicates use of the other) may present the optimal candidates for merging.

In addition to the customer usage information, it may be important to know more about the disruption each business function could cause. At 320, disruption categories may be determined and assigned to each business function, e.g., as illustrated in FIG. 2. Additionally, other assessments of the potential disruption to customers not yet using a business function caused by the business function consolidation, may be implemented at 320. For example, based on analysis of conflicts and dependencies, a metric may be determined related to the amount of effort (e.g., in programmer development hours) each consolidation is likely to take. FIG. 3 may represent an example embodiment of an example procedure to initialize the relevant functions for actual analysis.

Figure 4:
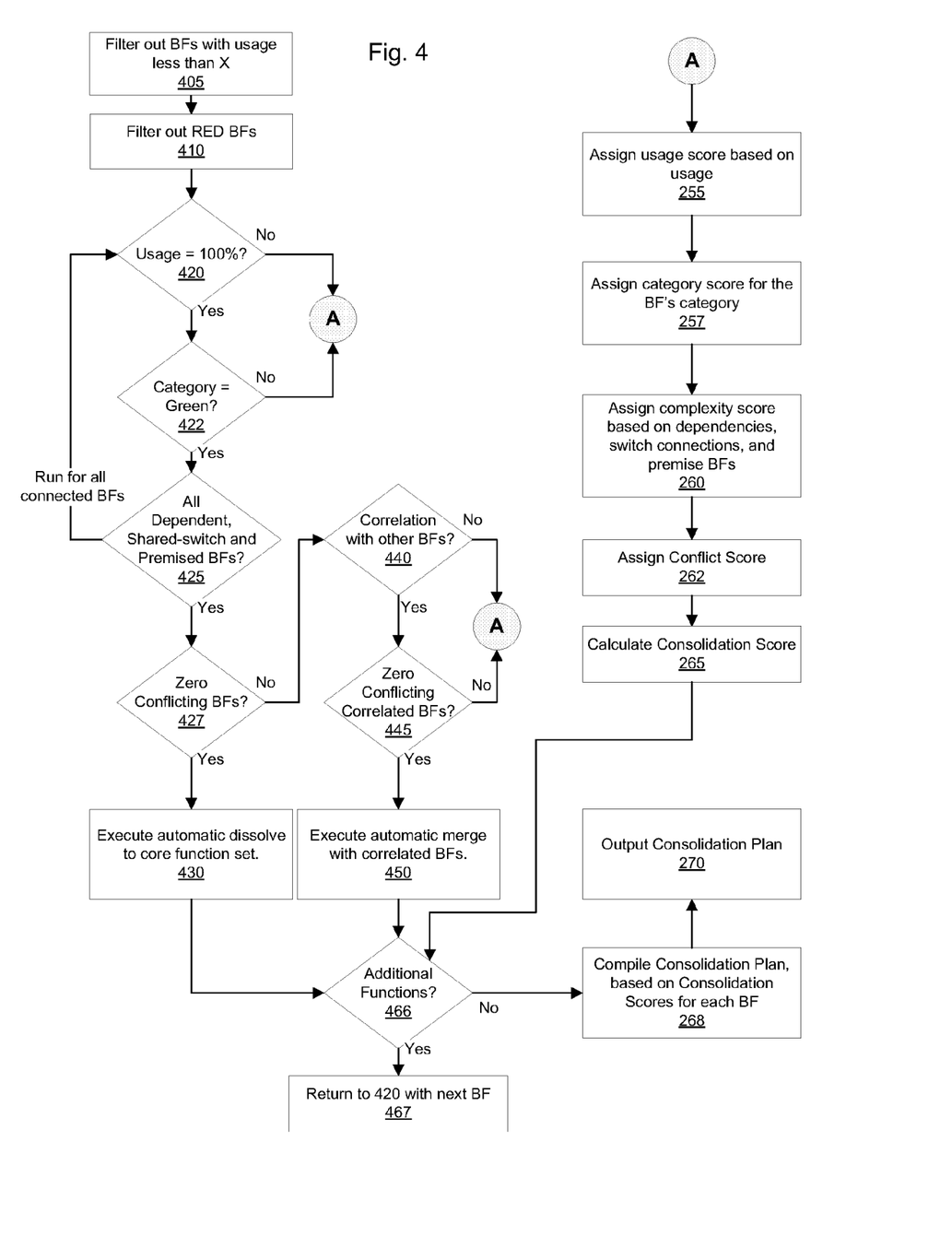
FIG. 4 illustrates an example consolidation process, according to one example embodiment of the present invention.

One example embodiment of the analysis and consolidation process is illustrated in FIG. 4. In this example embodiment, the process may start with a set of business functions and first filter out those business functions that are used by fewer than some number of customers (e.g., 80%). Next, at 410, the example process may filter out those business functions with a "red" or "most critical" categorization. These initial steps may not be included in other example embodiments, and may be set by configuration data, e.g., those included at 310 of FIG. 3. In this example embodiment, the user may determine that red category business functions will require too much manual effort or pose too many problems for consolidation. The user may have set the red category conditions with parameters that the user knows will put those functions out of bounds for consolidation. Further, as was previously discussed, the higher the usage percentage, generally, the lower the potential for customer disruption. Because of this, some usage cut off (e.g., "X" of 405) may be configured by the user to screen out low usage level business functions.

Next, the example process may engage in a number of steps to both automatically consolidate some business functions and automatically compile a consolidation plan for those business functions that need some manual intervention by the development team(s). For example, at 420 and 422, the example process may test each remaining business function for 100% usage and a categorization of "Green" (e.g., a third level of criticality). These may be configured by the user in a number of ways, for other example embodiments and implementations. For example, usage may be set at ">96.7%" and category may be set for "default, green, or yellow," etc. However, if either of these conditions fails, the example process may proceed (e.g., via process marker "A"). At 425, the process may loop back to test the category and usage of every business function that depends from the originally tested function, every business function that is a premise of that original business function (e.g., is an ancestor of the business function in the overall organizational structure), and every business function that shares a switch with the original business function, either in the same software layer or other software components. Further, this process may operate again (e.g., at 425) for the dependents, ancestors, and switch-sharing functions of those connected to the original function. In this way, recursive analysis may be performed for all connected business functions, whether connected directly or indirectly.

If all of the connected business functions pass these first steps, the business function may next, at 427, be checked for conflicting business functions, e.g., functions that cannot be active while this business function is active. If the business function passes this additional parameter, the example process may execute an automatic dissolve. In many contexts, very few business functions may make it to this step, as it may require near 100% confidence that no disruption will occur based on its dissolution. In other, less critical contexts, it may not be as important to ensure small disruptive changes are prevented, and the parameters may be adjusted to allow more functions to reach the auto-dissolve step of 430. In other example embodiments, step 430 may be replaced with a step to construct a list of business functions that may be consolidated automatically (e.g., "Add to list of automatically dissolvable functions 430"). The development teams may then decide which ones and when the automatic consolidation should occur. This list may be digitally selectable, such that a user may be presented with the list of business functions in this category with the option to execute the dissolve function on one or more of the functions. After 430, the example process may iterate to the next business function by returning to 420, e.g., via 466 and 467. If a business function fails any of the conditions for automatic dissolution, e.g., at 425 or 427, any correlated business functions may be analyzed at 440. If the original business function has a certain usage and category, and there are correlated business functions, but the function may fail one of the other automatic dissolution criteria, then at 445, the business function may be checked for conflicts among the correlated functions. If there are no conflicts, the example process may automatically merge the correlated functions into a single switched function or set of functions sharing a single switch, e.g., at 450. Similar to step 430 above, step 450 may be replaced with a step "Add to list of functions able to be automatically merged 450." This list may then be presented to a user, who may initiate the auto-merge process for one or more functions in the list. An embodiment where business functions are presented to the user as ready to be consolidated (e.g., with just a command, but not manual reconfiguring) may provide a benefit of less stringent analysis criteria. For example, for an embodiment to automatically dissolve or merge a function, it may be a requirement that this function have zero conflicts with any other function, and that every function that depends on this function or from whom the function itself depends are all also conflict free. However, when including the function in the consolidation compilation, the function may be listed as, e.g., "automatically dissolvable after premised function X is consolidated and dependent function Y is consolidated." This way, the user knows that there is no work to be done for the function, and it will be ready for automatic consolidation, once the other two functions are finished.

This data too, may be used to prioritize the resulting compilation. For example, the resulting compilation may provide a roadmap to an efficient consolidation. Thus, if some function X will be ready for consolidation after 1 programmer hour, and some other function Y will be ready for consolidation after 2 programmer hours, function X may be prioritized as faster. However, if in this example, it is determined that some number of functions (e.g., 10) are ready for consolidation conditioned on the consolidation of function X, while some lower number of functions (e.g., 2) are ready for consolidation conditioned on the consolidation of function Y, it may be that more work-accomplished per programmer hour is associated with the consolidation of function Y. These prioritizations, and a weighting of different priority aspects may be specified in the user configuration parameters. For example, in the above example, where both function X and function Y must be consolidated, function Y may be the priority, since the longer timeframe functions should be consolidated first, with shorter time frame functions being consolidated concurrently with the longer, and consecutively with each other.

This process order is just one example embodiment, and others are possible. For example, the arrangement of FIG. 4 illustrates a preference for dissolving over merging (in that any function that qualifies for both, will be dissolved at 430 before reaching 450). However, in another example embodiment, where 430 and 450 add the function to a list of functions capable of automatic dissolving or merging, the user may be presented these lists, and select which function should be applied. Alternatively, three lists may be constructed, dissolvable, merge-capable, and both dissolvable and merge-capable (and functions in the list of both may or may not appear redundantly in each of the other two single-function lists). In another example embodiment, the user may specify in the configuration data which function should be preference, e.g. specify merge before dissolve or specify dissolve before merge (e.g., as illustrated in FIG. 4). Likewise, configuration data may be used to specify automatic execution or inclusion in a list of functions capable of automatic merge/dissolve.

If criteria of neither of the automatic consolidation criteria are met, the example process may move to 255 (e.g., via process marker "A"). Here, the function may be given a usage score, based on the determined customer usage level. These scores may be customized and configured by the user to specify the priorities of a specific project. Next, at 257, a category score may be assigned, based on the business function's assigned category. Next, at 260, a complexity score may be determined and assigned, based on connected functions. This score may be based on the number of dependents and/or ancestor business functions, the number of generations above and/or below the business function, the number of functions connected in the tree, including those functions connected to functions connected to the business function, or any number of other parameters related to dependencies. Further, the number of shared switches and/or functions connected via a shared switch, along with how far away the software levels and/or software components are from the business function may factor into the complexity score. This score may be customized for specific implementations, depending on the context of the specific projects and priorities.

Next, at 262, a conflict score may be assigned, based on the number of conflicts detected with other business functions, along with the type of conflict. From these attribute scores, a total consolidation score may be calculated at 265. This calculation score may be calculated for each business function that is a candidate for consolidation, and stored with that business function or in association with the business function. Once the business functions consolidation score is calculated, the example process may iterate to the next business function candidate at 420, via 466 and 467. Once all of the candidate functions have been processed, e.g., as determined at 466, the example process may compile a consolidation plan, based on each consolidation score, e.g., at 268, and output the plan at 270. The compilation may also be customizable by the user, but generally may include an organization of the functions that may be consolidated, but could not be automatically consolidated, along with technical information and notes regarding why they were scored the way they were and what needs to happen to facilitate their consolidation. In the embodiments where automatic consolidation is contingent on user initiation (e.g., via provided lists of functions capable of automatic consolidation), these lists may also be included in the resulting compilation.

The resulting compilation may be determined as a function of user input and configuration settings, and thus may ultimately be defined for each different implementation. Generally, an example resulting compilation may include a summary of the starting parameters and the selection criteria that was applied by the engine during analysis. It may include one or more lists of qualifying business functions, including: all of the functions, those functions that passed initial filtering, those functions ready for automatic dissolving, those functions ready for automatic merging, those functions capable of both automatic dissolving and automatic merging, and/or those functions requiring manual work before consolidation. In the latter case, the list may be prioritized and organized according to the complexity scores associated with the various analysis components described above. Each relevant function (e.g., each business function of the manual effort list), may have an associated proposal of how to consolidate that business function, as determined by the configuration parameters. Each function may indicate its criticality category, disruption score, usage score, and complexity score. Each function may provide a list, hierarchy, or other representation of that functions dependencies. Finally, the resulting compilation may provide a work list, based on the prioritization, of a proposed wordlist, representing an efficient path to consolidation of business functions requiring manual adjustment.

Figure 5:
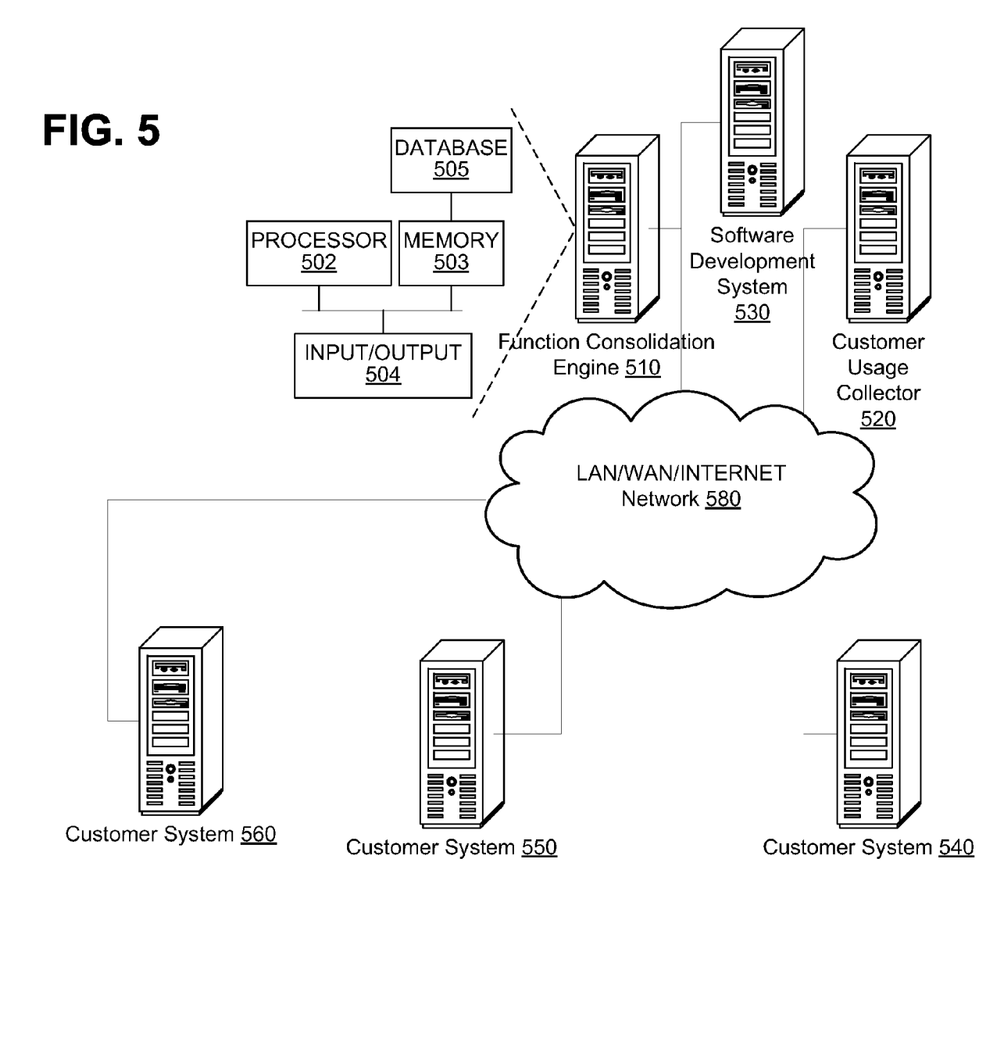
FIG. 5 illustrates an example system, according to one example embodiment of the present invention.

FIG. 5 illustrates one example system, according to an example embodiment of the present invention. The example may include one or more server computer systems, e.g., function consolidation engine 510. This may be one server, a set of local servers, or a set of geographically diverse servers. Each server may include an electronic computer processor 502, one or more sets of memory 503, including database repositories 505, and various input and output devices 504. These too may be local or distributed to several computers and/or locations. Any suitable technology may be used to implement embodiments of the present invention, such as general purpose computers. There may be a software development system 530, which may be on a different server, or run on the same server as the function consolidation engine. There may be a customer usage collector 520, which also may run on a separate server or one or more of the other servers. These system servers may be connected to one of more customer system 540 to 560 via a network 580, e.g., the Internet. One or more system servers may operate hardware and/or software modules to facilitate the inventive processes and procedures of the present application, and constitute one or more example embodiments of the present invention. Further, one or more servers may include a computer readable medium, e.g., memory 503, with instructions to cause a processor, e.g., processor 502, to execute a set of steps according to one or more example embodiments of the present invention.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method of facilitating software function consolidation, comprising:
    loading, with an electronic processor, customer usage data, wherein the customer usage data indicates use of a plurality of software functions and includes data from a plurality of customers;
    identifying, from the plurality of software functions, enhancement functions each with an associated switch to toggle the enhancement function between on and off states, and one or more core functions, which are always-on;
    calculating, with the electronic processor, a criticality level, a usage level, a usage correlation level, and a complexity level for each enhancement function according to a plurality of user defined parameters and the individual function's relationship with other functions, wherein the usage level is a metric that represents a number of customers that use a particular enhancement function, the criticality level is an indication of the importance of the function, the usage correlation level is a metric that indicates whether a particular enhancement function can be used with other enhancement functions; and the complexity level is a metric based on a number of dependencies each enhancement function has and a number of development objects associated with the enhancement function;
    for each enhancement function where the usage level meets a usage threshold:
        dissolving each particular enhancement function into a core function if the particular enhancement function's criticality level meets a user-defined criticality threshold and if the particular enhancement function's usage correlation level meets a user-defined usage correlation threshold;
        merging a plurality of enhancement functions into a single enhancement function when each function of the plurality of enhancement functions has a usage correlation level with another non-conflicting enhancement functions' correlation level of the plurality of enhancement functions, that is above a correlation threshold;
    prioritizing, with the electronic processor, a plurality of remaining enhancement functions, according to a complexity level calculated by the electronic processor based on user supplied parameters and the complexity level; and
    outputting a consolidation plan to the user comprising the dissolved, merged, and prioritized enhancement functions.

2. The method of claim 1, wherein meeting the criticality threshold includes a criticality level lower than the criticality threshold.

3. The method of claim 1, wherein meeting the usage threshold includes a usage greater than the usage threshold.

4. The method of claim 1, wherein meeting the complexity threshold includes a complexity level lower than the complexity threshold.

5. The method of claim 1, wherein merging, for a first function with a first set of switches and a second function with a second set of switches, includes assigning both the first set of switches and the second set of switches to both the first function and the second function.

6. The method of claim 1, wherein one user supplied parameters defines a timeframe for consolidation, and the complexity threshold is set as a function of the timeframe, such that functions that are too complex to be consolidated within the timeframe are excluded.

7. A system for facilitating software function consolidation, comprising:
    an electronic processor in communication with a data repository, configured to:
    loading, with an electronic processor, customer usage data, wherein the customer usage data indicates use of a plurality of software functions and includes data from a plurality of customers;
    identify, from the plurality of software functions, enhancement functions each with an associated switch to toggle the enhancement function between on and off states, and one or more core functions, which are always-on;

calculate, with the electronic processor, a criticality level, a usage level, a usage correlation level, and a complexity level for each enhancement function according to a plurality of user defined parameters and the individual function's relationship with other functions, wherein the usage level is a metric that represents a number of customers that use a particular enhancement function, the criticality level is an indication of the importance of the function, the usage correlation level is a metric that indicates whether a particular enhancement function can be used with other enhancement functions;

and the complexity level is a metric based on a number of dependencies each enhancement function has and a number of development objects associated with the enhancement function;

for each enhancement function where the usage level meets a usage threshold:

dissolve each particular enhancement function into a core function if the particular enhancement function's criticality level meets a user-defined criticality threshold and if the particular enhancement function's usage correlation level meets a user-defined usage correlation threshold;

merge a plurality of enhancement functions into a single enhancement function when each function of the plurality of enhancement functions has a usage correlation level with another non-conflicting enhancement functions' correlation level of the plurality of enhancement functions, that is above a correlation threshold;

prioritize, with the electronic processor, a plurality of remaining enhancement functions, according to a complexity level calculated by the electronic processor based on user supplied parameters and the complexity level; and output a consolidation plan to the user comprising the dissolved, merged, and prioritized enhancement functions.

8. The system of claim 7, wherein meeting the criticality threshold includes a criticality level lower than the criticality threshold.

9. The system of claim 7, wherein meeting the usage threshold includes a usage greater than the usage threshold.

10. The system of claim 7, wherein meeting the complexity threshold includes a complexity level lower than the complexity threshold.

11. The system of claim 7, wherein merging, for a first function with a first set of switches and a second function with a second set of switches, includes assigning both the first set of switches and the second set of switches to both the first function and the second function.

12. The system of claim 7, wherein one user supplied parameters defines a timeframe for consolidation, and the complexity threshold is set as a function of the timeframe, such that functions that are too complex to be consolidated within the timeframe are excluded.

13. A non-transitory, computer-readable storage medium encoded with instructions configured to be executed by a processor, the instructions which, when executed by the processor, cause the performance of a method, comprising:

loading, with an electronic processor, customer usage data, wherein the customer usage data indicates use of a plurality of software functions and includes data from a plurality of customers;

identifying, from the plurality of software functions, enhancement functions each with an associated switch to toggle the enhancement function between on and off states, and one or more core functions, which are always-on;

calculating, with the electronic processor, a criticality level, a usage level, a usage correlation level, and a complexity level for each enhancement function according to a plurality of user defined parameters and the individual function's relationship with other functions, wherein the usage level is a metric that represents a number of customers that use a particular enhancement function, the criticality level is an indication of the importance of the function, the usage correlation level is a metric that indicates whether a particular enhancement function can be used with other enhancement functions;

and the complexity level is a metric based on a number of dependencies each enhancement function has and a number of development objects associated with the enhancement function;

for each enhancement function where the usage level meets a usage threshold:

dissolving each particular enhancement function into a core function if the particular enhancement function's criticality level meets a user-defined criticality threshold and if the particular enhancement function's usage correlation level meets a user-defined usage correlation threshold;

merging a plurality of enhancement functions into a single enhancement function when each function of the plurality of enhancement functions has a usage correlation level with another non-conflicting enhancement functions' correlation level of the plurality of enhancement functions, that is above a correlation threshold;

prioritizing, with the electronic processor, a plurality of remaining enhancement functions, according to a complexity level calculated by the electronic processor based on user supplied parameters and the complexity level; and outputting a consolidation plan to the user comprising the dissolved, merged, and prioritized enhancement functions.

* * * * *